United States Patent
Su et al.

(10) Patent No.: US 12,091,495 B2
(45) Date of Patent: *Sep. 17, 2024

(54) CURING AGENT FOR EPOXY RESINS

(71) Applicant: Huntsman Petrochemical LLC, The Woodlands, TX (US)

(72) Inventors: Wei-Yang Su, The Woodlands, TX (US); Hui Zhou, The Woodlands, TX (US)

(73) Assignee: HUNTSMAN PETROCHEMICAL LLC, The Woodlands, TX (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/992,971

(22) Filed: Nov. 23, 2022

(65) Prior Publication Data

US 2023/0151139 A1    May 18, 2023

Related U.S. Application Data

(63) Continuation of application No. 16/476,972, filed as application No. PCT/US2018/016803 on Feb. 5, 2018, now Pat. No. 11,542,364.

(60) Provisional application No. 62/455,018, filed on Feb. 6, 2017.

(51) Int. Cl.
*C08G 59/56* (2006.01)
*C08G 59/24* (2006.01)
*C08G 59/50* (2006.01)
*C08G 59/62* (2006.01)

(52) U.S. Cl.
CPC ........... *C08G 59/56* (2013.01); *C08G 59/245* (2013.01); *C08G 59/5026* (2013.01); *C08G 59/504* (2013.01); *C08G 59/5046* (2013.01); *C08G 59/62* (2013.01)

(58) Field of Classification Search
CPC .... C08G 59/56; C08G 59/686; C08G 59/245; C08G 59/5026; C08G 59/504; C08G 59/5046; C08G 59/62; C08L 63/00
See application file for complete search history.

(56) References Cited

U.S. PATENT DOCUMENTS

| 4,195,153 A * | 3/1980 | Waddill | C08L 63/00 528/111 |
| 2013/0090450 A1* | 4/2013 | Burton | C08G 59/56 528/94 |

* cited by examiner

*Primary Examiner* — Shane Fang
(74) *Attorney, Agent, or Firm* — HUNTSMAN PETROCHEMICAL LLC; Aleece Hayes

(57) ABSTRACT

A curing agent comprising a polyetheramine, a tertiary amine substantially free of an aromatic tertiary amine and glycerin. The curing agent may be combined with an epoxy resin to form a curable composition which is capable of being applied to a substrate and cured to form a cured article.

17 Claims, No Drawings

CURING AGENT FOR EPOXY RESINS

CROSS-REFERENCE TO RELATED APPLICATION

The present application is a continuation application of U.S. patent application Ser. No. 16/476,972, filed Jul. 10, 2019, pending, which is a National Stage application filed under 35 U.S.C. § 371 of International Application No. PCT/US2018/016803 filed Feb. 5, 2018, which designated the U.S. and which claims priority to U.S. Provisional Patent Application Ser. No. 62/455,018, filed Feb. 6, 2017, the entire contents of which are hereby expressly incorporated herein by reference.

STATEMENT REGARDING FEDERALLY SPONSORED RESEARCH OR DEVELOPMENT

Not applicable.

FIELD OF THE INVENTION

The present disclosure generally relates to a curing agent comprising a polyetheramine, a tertiary amine and glycerin. The curing agent may be combined with an epoxy resin to form a curable composition which can be applied to a substrate and cured to form a cured article.

BACKGROUND OF THE INVENTION

Curable compositions based on epoxy resins and various curing agents are used in the industry on a large scale to produce cured epoxy resins. As typical representative examples of curing agents, there are, for example, diethylenetriamine, triethylenetetramine, isophoronediamine, diaminodiphenylmethane, diaminodiphenylsulfone, polyamides, dicyandiamide, hexahydrophthalic anhydride, methyltetrahydrophthalic anhydride, methyl nadic anhydride, imidazoles, and amine complexes of boron trifluoride.

Polyetheramines have also been used in the curing of epoxy resins to provide cured articles that exhibit superior physical properties in many applications, such as composites, castings, adhesives, etc. (see, e.g., WO 2016/089663; U.S. Pat. Nos. 9,012,020; 8,399,577; US Pat. Appl. Pub. No. 2013/0012669; U.S. Pat. Nos. 7,816,481; and 3,654,370, each of which is hereby incorporated by reference to the extent that they do not contradict the present disclosure). However, the cost of such polyetheramines may be considered too high for use in some applications (e.g. floor coatings) in which the cured article exhibits physical properties much better than generally required. Accordingly, it would be desirable to develop new polyetheramine-based curing agents having a reduced usage level of polyetheramine thereby reducing raw material cost yet are still effective in curing epoxy resins to produce cured articles having acceptable physical and thermal properties.

SUMMARY OF THE INVENTION

The present disclosure generally provides a curing agent comprising (i) a polyetheramine; (ii) a tertiary amine substantially free of an aromatic tertiary amine; and (iii) glycerin.

In other aspects, there is provided a curable composition comprising the curing agent of the present disclosure and an epoxy resin.

In still other aspects, there is provided a cured article obtained by applying the curable composition to a substrate and curing the curable composition.

DETAILED DESCRIPTION OF THE INVENTION

The present disclosure generally provides a curing agent comprising (i) a polyetheramine selected from a polyether monoamine, a polyether diamine, a polyether triamine, a multifunctional polyetheramine and a mixture thereof; (ii) a tertiary amine substantially free of an aromatic tertiary amine; and (iii) glycerin. It has been surprisingly found that this combination of components not only produces a curing agent at a much lower cost than that for state of the art polyetheramine-based curing agents, but can also rapidly cure an epoxy resin to provide a cured article having an excellent balance of physical and thermal properties.

The following terms shall have the following meanings:

As used herein, the term "curing" or "cure" refers to the hardening of an epoxy resin by chemical cross-linking. The term "curable" means that the composition is capable of being subjected to conditions which will render the composition to a cured or thermoset state or condition.

The term "alkyl" means a straight or branched-chain alkyl group such as, for example, methyl, ethyl, propyl, isopropyl, butyl, sec-butyl, t-butyl and pentyl.

The term "aromatic tertiary amine" refers to a tertiary amine containing an aryl moiety, with the term "aryl" referring to a substituted or unsubstituted aromatic carbocyclic radical having 6 to 14 carbon atoms.

The term "cycloalkyl" means a cycloaliphatic group containing from 3 to 10 carbon atoms including, but not limited to, cyclopropyl, cyclobutyl, cyclopentyl and cyclohexyl.

The term "heterocycloalkyl" includes heterocycloalkyl groups containing 3 to 6 carbon atoms and one or two oxygen, sulphur or nitrogen atoms. Particular examples of such groups include azetidinyl, pyrrolidinyl, piperidinyl, homopiperidinyl, piperazinyl, homopiperazinyl, morpholinyl and thiomorpholinyl groups.

The term "substantially free" means, when used with reference to the substantial absence of a material in a formulation, that such a material is not present, or if at all, as an incidental impurity or by-product. In other words, the material does not affect the properties of the formulation.

The term "comprising" and derivatives thereof are not intended to exclude the presence of any additional component, step or procedure, whether or not the same is disclosed herein. In order to avoid any doubt, all compositions claimed herein through use of the term "comprising" may include any additional additive or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or more than one (i.e. to at least one) of the grammatical object of the article. By way of example, "an epoxy resin" means one epoxy resin or more than one epoxy resin.

The phrases "in one aspect", "according to one aspect" and the like generally mean the particular feature, structure, or characteristic following the phrase is included in at least one aspect of the present disclosure, and may be included in more than one aspect of the present disclosure. Importantly, such phases do not necessarily refer to the same aspect.

If the specification states a component or feature "may", "can", "could", or "might" be included or have a characteristic, that particular component or feature is not required to be included or have the characteristic.

Curing Agent

According to one aspect, the curing agent of the present disclosure includes: (i) a polyetheramine selected from the group consisting of: a polyether monoamine; a polyether diamine; a polyether triamine; a multifunctional polyetheramine and a mixture thereof; (ii) a tertiary amine substantially free of an aromatic tertiary amine; and (iii) glycerin.

In one aspect, the polyetheramine is a polyether monoamine having the formula (1) or (1a):

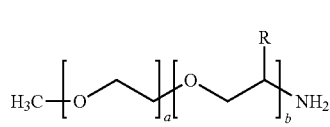

where R is hydrogen, methyl or ethyl, and
a and b independently are integers from about 1 to about 150; or

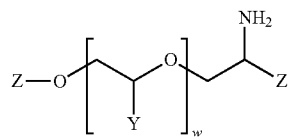

where Y is hydrogen, methyl or ethyl,
Z is a $C_1$-$C_{40}$ alkyl group or a $C_1$-$C_{40}$ alkyl phenol group and
w is an integer from about 1 to about 100.

In still another aspect, the polyetheramine is a polyether monoamine having the formula (2) or (2a):

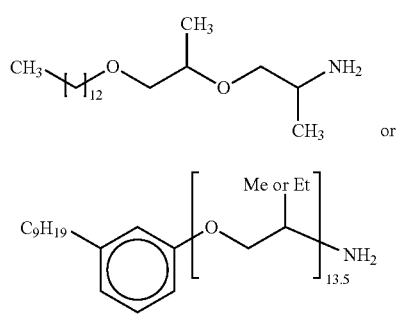

where Me is methyl and Et is ethyl.

Commercially available polyether monoamines include the JEFFAMINE® M-series and XTJ-series amines, including, but not limited to, JEFFAMINE® M-600, M-1000, M-2005, M-2070, XTJ-435 and XTJ-436 amines, available from Huntsman Petrochemical LLC.

In yet another aspect, the polyetheramine is a polyether diamine having the formula (3), (4) or (5):

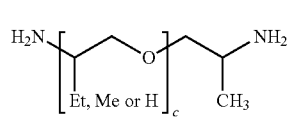

where c is an integer from about 2 to about 100,
H is hydrogen, Me is methyl, Et is ethyl,

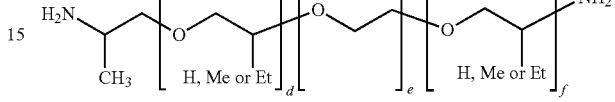

where H is hydrogen, Me is methyl, Et is ethyl,
e is an integer from about 2 to about 40, and
d and f independently are integers from about 1 to about 10; or

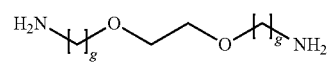

where g is an integer from about 2 to about 3.

Commercially available polyether diamines include the JEFFAMINE® D, ED and EDR amines, including, but not limited to, JEFFAMINE® D-230, D-400, D-2000, D-4000, ED-600, ED-900, ED-20003, EDR-148 and EDR-176 amines, available from Huntsman Petrochemical LLC.

In still yet another aspect, the polyetheramine is a polyether triamine having the formula (6):

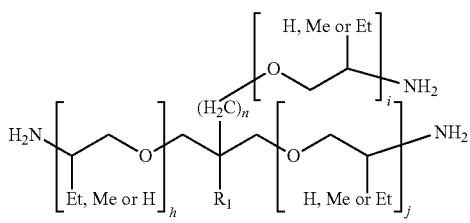

where $R_1$ is hydrogen, methyl or ethyl,
H is hydrogen, Me is methyl, Et is ethyl,
n is an integer of 0 or 1, and
h, i and j independently are integers from about 1 to about 100.

Commercially available polyether triamines include the JEFFAMINE® T-series amines, including, but not limited to, JEFFAMINE® T-403, T-3000 and T-5000 amines, available from Huntsman Petrochemical LLC.

In another aspect, the polyetheramine is a multifunctional polyetheramine. The multifunctional polyetheramine may be a polyether di- or triamine, such as those described herein, having at least one of the hydrogens of the amine groups replaced by a hydroxyl group. For example, the multifunctional polyetheramine may have the formula (7)

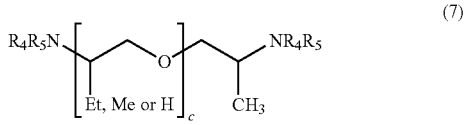

(7)

where each $R_4$ and $R_5$ are independently hydrogen or a hydroxyl group, with the proviso that at least one of $R_4$ is a hydrogen and at least one of $R_5$ is a hydroxyl group, H is hydrogen, Me is methyl and Et is ethyl.

In one particular aspect, the polyetheramine is selected from the group consisting of a polyether monoamine, a polyether diamine and a mixture thereof. In still another particular aspect, the polyetheramine is a polyether diamine.

According to another aspect, the curing agent includes at least about 65% by weight of a polyetheramine, where the % by weight is based on the total weight of the curing agent. In another aspect, the curing agent includes at least about 70% by weight of the polyetheramine, or at least about 75% by weight of the polyetheramine, where the % by weight is based on the total weight of the curing agent. In still yet another aspect, the curing agent includes the polyetheramine in an amount of at least about 80% by weight, or at least about 81% by weight, or at least about 82% by weight, or at least about 83% by weight, or at least about 84% by weight, or at least about 85% by weight, where the % by weight is based on the total weight of the curing agent.

In a further aspect, the curing agent includes from about 65% by weight to about 95% by weight of the polyetheramine, where the % by weight is based on the total weight of the curing agent. In another aspect, the curing agent includes from about 70% by weight to about 90% by weight of the polyetheramine, where the % by weight is based on the total weight of the curing agent. In still another aspect, the curing agent includes from about 75% by weight to about 85% by weight of the polyetheramine, where the % by weight is based on the total weight of the curing agent.

The curing agent also includes a tertiary amine substantially free of an aromatic tertiary amine. In one aspect, the tertiary amine is a compound having the formula $NR_7R_8R_9$ where: (a) $R_7$, $R_8$ and $R_9$ independently are $C_1$-$C_{10}$ alkyl groups; or (b) $R_7$ and $R_8$ are joined as a heterocycloalkyl residue and $R_9$ is a $C_1$-$C_{10}$ alkyl group; or (c) $R_7$ and $R_8$ independently are $C_1$-$C_{10}$ alkyl groups and $R_9$ is a cycloalkyl group.

Exemplary tertiary amines include, but are not limited to, trimethylamine, triethylamine, tri-n-propylamine, tri-n-butylamine, tri-iso-propylamine, tri-iso-butylamine, dimethylaminocyclohexane, diethylaminocyclohexane, dimethylaminocyclopentane, diethylaminocyclopentane, N-methylmorpholine, N—N-methylpyrrolidine, N-ethylpyrrolidine, N-n-propylpyrrolidine, N-iso-propylpyrrolidine, N-methylpiperidine, N-ethylpiperidine, N-n-propylpiperidine, N-iso-propylpiperidine, N,N'-dimethylpiperazine, N,N'-diethylpiperazine, N,N'-dipropylpiperazine, and mixtures thereof. In one particular aspect, the tertiary amine is trimethylamine, triethylamine, tri-n-propylamine, tri-iso-propylamine, tri-n-butylamine, dimethylaminocyclohexane or N-methylmorpholine. In another aspect, the tertiary amine is dimethylaminocyclohexane or N-methylmorpholine.

In one aspect, the curing agent may include less than about 10% by weight of the tertiary amine, where the % by weight is based on the total weight of the curing agent. In another aspect, the curing agent includes less than about 8% by weight of the tertiary amine, or less than about 7.5% by weight of the tertiary amine, where the % by weight is based on the total weight of the curing agent. In still yet another aspect, the curing agent includes the tertiary amine in amount of less than about 5% by weight, or less than about 4% by weight, or less than about 3% by weight, or less than about 2.5% by weight, or less than about 2% by weight, or at less than about 1% by weight, where the % by weight is based on the total weight of the curing agent.

In still another aspect, the curing agent includes from about 0.1% by weight to about 10% by weight of the tertiary amine, where the % by weight is based on the total weight of the curing agent. In another aspect, the curing agent includes from about 0.5% by weight to about 5% by weight of the tertiary amine, where the % by weight is based on the total weight of the curing agent. In still another aspect, the curing agent includes from about 1% by weight to about 3% by weight of the tertiary amine, where the % by weight is based on the total weight of the curing agent.

The curing agent also includes glycerin. In one aspect, the curing agent includes less than about 30% by weight of glycerin, where the % by weight is based on the total weight of the curing agent. In another aspect, the curing agent includes less than about 25% by weight of glycerin, or at less than about 20% by weight of glycerin, where the % by weight is based on the total weight of the curing agent. In still yet another aspect, the curing agent includes glycerin in an amount of less than about 15% by weight, or less than about 14% by weight, or less than about 13% by weight, or less than about 12% by weight, or less than about 11% by weight, or less than about 10% by weight, where the % by weight is based on the total weight of the curing agent.

In yet another aspect, the curing agent includes from about 1% by weight to about 25% by weight of glycerin, where the % by weight is based on the total weight of the curing agent. In another aspect, the curing agent includes from about 5% by weight to about 20% by weight of glycerin, where the % by weight is based on the total weight of the curing agent. In still another aspect, the curing agent includes from about 10% by weight to about 15% by weight of glycerin, where the % by weight is based on the total weight of the curing agent.

Curable Composition

According to another aspect, there is provided a curable composition that includes: (i) an epoxy resin; and (ii) the curing agent of the present disclosure comprising a polyetheramine, a tertiary amine substantially free of an aromatic tertiary amine and glycerin as described above.

In general, any epoxy-containing compound is suitable for use as the epoxy resin in the present disclosure, such as the epoxy-containing compounds disclosed in U.S. Pat. No. 5,476,748 which is incorporated herein by reference. The epoxy resin may be solid or liquid. In one embodiment, the epoxy resin is selected from the group consisting of: a polyglycidyl epoxy compound; a non-glycidyl epoxy compound; an epoxy cresol novolac compound; an epoxy phenol novolac compound; and a mixture thereof.

The polyglycidyl epoxy compound may be a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino) diphenylmethane.

Particularly important representatives of polyglycidyl ethers or poly((β-methylglycidyl)ethers are based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)sulfone (Bisphenol S), alkoxylated Bisphenol A, F or S, triol extended Bisphenol A, F or S, brominated Bisphenol A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(β-methylglycidyl)esters may be produced by reacting epichlorohydrin or glycerol dichlorohydrin or 3-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, may be used.

In another aspect, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups.

Particular examples of non-glycidyl epoxy compound's include the following difunctional non-glycidyl epoxide compounds in which the epoxide groups form part of an alicyclic or heterocyclic ring system: bis(2,3-epoxycyclopentyl)ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl.

In some particular aspects, the difunctional non-glycidyl epoxy compounds include cycloaliphatic difunctional non-glycidyl epoxies, such as 3,4-epoxycyclohexyl-methyl 3',4'-epoxycyclohexanecarboxylate and 2,2'-bis-(3,4-epoxy-cyclohexyl)-propane, with the former being most preferred.

In yet another aspect, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl)ether.

It is also possible to employ epoxy resins in which the 1,2-epoxide groups are attached to different heteroatoms or functional groups. Examples include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may also be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methylpropoxy)ethane.

Additionally, the epoxy resin may be a pre-reacted adduct of an epoxy resin, such as those mentioned above, with compounds having a free hydrogen that is reactive with an epoxy group. Typically, such reactive hydrogens are found in carboxylic acid groups, aromatic hydroxyl groups, amino groups, and sulfhydryl groups.

The amount of epoxy resin used in the curable composition may depend on the targeted molecular weight and epoxy functionality. In some aspects, the curable composition may include the epoxy resin in an amount of from about 30% by weight to about 85% by weight, where the % by weight is based on the total weight of the curable composition. In other aspects, the curable composition may include the epoxy resin in an amount from about 40% by weight to about 85% by weight, or from about 45% by weight to about 80% by weight, where the % by weight is based on the total weight of the curable composition.

In another aspect, the curable composition contains the curing agent of the present disclosure described above. In some aspects, the curable composition may include the curing agent in an amount of at least about 5% by weight, or at least 10% by weight or at least 15% by weight or at least 20% by weight, based on the total weight of the curable composition.

In yet another aspect, in addition to the epoxy resin and curing agent of the present disclosure, the curable composition may also contain one or more other additives which are useful for their intended uses. For example, the optional additives useful in the curable composition may include, but are not limited to, diluents (1,4-butanediol diglycidyl ether (BDDGE), 1,6 hexanediol diglycidyl ether (HDDGE), cresol diglycidyl ether (CGE), C12-14 alkyl glycidyl ether (AGE), trimethylol propane triglycidyl ether (TMPTGE)), inert fillers, reinforced fibers (carbon fiber, glass fiber, aramid fiber, boron fiber, silicon carbide fiber), stabilizers, surfactants, flow modifiers, pigments or dyes, release agents, matting agents, degassing agents, flame retardants (e.g., inorganic flame retardants, halogenated flame retardants, and non-halogenated flame retardants such as phosphorus-containing materials), toughening agents (for e.g. carboxyl terminated liquid butadiene acrylonitrile rubber (CTBN), acrylic terminated liquid butadiene acrylonitrile rubber (ATBN), epoxy terminated liquid butadiene acrylonitrile rubber (ETBN), liquid epoxy resin (LER) adducts of elastomers and preformed core-shell rubbers), curing initiators, curing inhibitors, wetting agents, processing aids, fluorescent compounds, UV stabilizers, antioxidants, impact modifiers and mixtures thereof.

When present, the amount of additives included in the curable composition may be at least about 0.5% by weight, or at least 2% by weight, or at least 5% by weight or at least 10% by weight, based on the total weight of the curable composition.

Further, the curable compositions within the scope of the present disclosure can be solventless, also referred to as solvent-free. Alternatively, the curable compositions of the present disclosure can further comprise at least one organic or aqueous solvent. Often, such solvent or mixture of solvents is chosen to give a specific evaporation rate profile for the curable composition while maintaining solubility of the components of the curable composition.

Examples of solvents which may be employed herein include, but are not limited to, aliphatic hydrocarbons, aromatic hydrocarbons, glycol ethers, amides, sulfoxides, sulfones, and mixtures thereof. Particular solvents may include, for example, hexane, heptane, octane, nonane, decane, toluene, xylene, ethylene glycol methyl ether, ethylene glycol ethyl ether, ethylene glycol n-butyl ether, ethylene glycol phenyl ether, propylene glycol methyl ether, propylene glycol phenyl ether, tripropylene glycol methyl ether, diethylene glycol methyl ether, diethylene glycol ethyl ether, diethylene glycol n-butyl ether, diethylene glycol phenyl ether, butylene glycol methyl ether, N,N-dimethylformamide, N-methylpyrolidinone, N,N-dimethylacetamide, dimethylsulfoxide, sulfolane and mixtures thereof.

In some aspects, the solvent may be included in the curable composition in amounts from about 5% by weight to about 95% by weight, where the % by weight is based on the total weight of the curable composition and solvent. In other aspects, the solvent may be used in amounts from about 10% by weight to about 60% by weight, or from about 20% by weight to about 40% by weight, where the % by weight is based upon the total weight of the curable composition and solvent.

Formulating the Curable Composition

The curable composition may be prepared by stirring and mixing the components in a state where the components are heated if needed, without particular limitation. The curable composition of the present disclosure may be a multi-package type (for e.g., 2-package type) composition where at least two of the components of the curable composition are prepared separately and packaged in separate containers (or vessels) and the curable composition is obtained by mixing the two or more separately prepared components (for e.g., Part A is the epoxy resin and Part B is the curing agent) at a predetermined ratio before use. The stirring/mixing method is not particularly limited. For example, there can be used a known or customary stirring/mixing unit such as a mixer (e.g., a dissolver, a homogenizer or a static mixer), a kneader, a roll, a bead mill, or a planetary stirring apparatus. The mixture after stirring and mixing may be subjected to defoam in a vacuum.

In another aspect, the curable composition of the present disclosure is 1-pot type composition achieved by admixing in a vessel the components including the epoxy resin and the curing agent of the present disclosure and then allowing the components to formulate into a curable composition. There is no criticality to the order of mixture, i.e., the components may be admixed in any order to provide the curable composition of the present disclosure. Any of the above-mentioned optional additives may also be added.

In one aspect, the epoxy resin and curing agent are combined so that the ratio of the number of the equivalents of reactive amine hydrogens in the curing agent to the number of the equivalents of epoxides present in the curable composition ranges from about 0.2 to about 1.3, or from about 0.4 to about 1, or even from about 0.4 to about 0.9, or still even from about 0.5 to about 0.85, and still even from about 0.6 to about 0.8 and in some cases from about 0.65 to about 0.75. In still other aspects, the epoxy resin and curing agent are combined at a weight ratio of epoxy resin:curing agent of at least about 1:1, or at least 1.2:1, or even at least about 1.5:1. In other aspects the weight ratio of epoxy resin:curing agent may be at least about 2:1, and still even at least 2.5:1, and even still at least about 3:1.

Also, the components of the curable composition may be mixed and dispersed at a temperature enabling the preparation of an effective curable composition having a low viscosity for the desired application. The temperature during the mixing of the components may be from about 0° C. to about 100° C. or from about 0° C. to about 50° C.

Cured Articles

According to another aspect, the curable composition, once formulated may be contacted with or applied to any suitable substrate and cured according to typical processes practiced by the industry to form a cured article. Cured articles in accordance with the present disclosure include, but are not limited to, a coating, an adhesive, a construction product, a flooring product, or a composite product.

Typical curing processes include ambient temperature cure to elevated temperature cure using thermal, radiation or a combination of energy sources. The curable composition may be cured in one step or multiple steps such as A, B staged cures often practiced in the industries. Or, the curable composition may be post-cured using a different temperature or energy source after the initial cure cycle.

The temperature at which the curing reaction may be conducted will depend on the specific epoxy resin and curing agent employed. Thus, in one aspect, the curing temperature may range from about 25° C. to 200° C., or from about 40° C. to about 195° C., or from about 45° C. to about 190° C., or from about 50° C. to about 185° C., or from about 60° C. to about 180° C. or from about 70° C. to about 135° C. In still other aspects, the curable composition may be cured at a temperature within the range of from about 80° C. to about 130° C.

The curable composition may be cured at the previous curing temperatures for a time effective to cure the epoxy resin and form the cured article. In some aspects, the curing time may be less than 72 hours. In other aspects, the curing time may be less than 48 hours, or less than 24 hours, or less than 16 hours, or less than 12 hours, or less than 10 hours, or less than 8 hours, or less than 6 hours, or less than 4 hours or less than 2 hours. In still other aspects, the curing time may be less than 60 minutes, or less than 45 minutes or less than 30 minutes.

In one aspect, the curable compositions described above may be used as a coating. For example, a process for forming a coated substrate may include the steps of applying the curable composition to a substrate to form the coated substrate. The curable composition may be applied to the substrate by any known technique such as by dipping, spray coating, die coating, roll coating, resin infusion processes, and contacting the substrate with a bath containing the curable composition. Types of substrates that may be coated include, for example, glass, wood, concrete, plastics or polymers that have a relatively high glass transition temperature ($T_g$) and/or melting point, reinforced fibers and metals. The substrate can be a flat sheet or coil of the desired material, or may have a more complex profile such as a pipe, tube, wire, or other shape.

In another particular aspect, the curable compositions may be used in industrial coating applications. Such industrial coatings may include surface protective coatings applied to substrates that are cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing or crosslinking, the polymeric binder hardens and functions as a binder for the pigments and provides adhesion of the dried paint film to the substrate. The pigments may be organic or inorganic and may functionally contribute to opacity and color in addition to durability and hardness.

In further aspects, powder paints may be obtained which comprise the curable compositions described herein, and suitable pigments, catalysts and additives. These powder paints and coatings therefrom may have a surprisingly good combination of properties. Depending on the choice and the amount of epoxy resin, curing agent and other optional additives, powder paints derived therefrom may have good flow, good chemical resistance, high gloss, high scratch resistance, good mechanical properties, good outdoor durability and good color stability.

In still other aspects, the curable compositions described herein may form part of water-based and oil-based dispersions. For example, water-dispersed coating compositions containing the curable compositions disclosed herein may be used for can and coil coating compositions.

In still another aspect, the curable composition may be used as an adhesive in methods for bonding one or more substrates together by contacting one or more surfaces of like or dissimilar substrates to be bonded with the curable composition under conditions sufficient to cure the curable composition including application of pressure and/or heat.

In still further aspects, the curable compositions may also be used in marine coatings, civil engineering applications, flooring, casting, crack or defect repair, molding, potting, filament winding, encapsulation, and structural and electrical laminates and composites. For example, composites formed using the curable composition disclosed herein may be used in windmill blades and other applications.

In an alternative aspect, the curable composition may be used to produce a composite article, such as in castings, prepregs, bonding sheets, laminates and metal-foil clad laminates by techniques well known in the industry, for example, by pultrusion, infusion, molding, encapsulating or coating. The properties of the composite articles can be tailored for certain applications by the addition of reinforced fibers.

Thus, in yet another aspect, there is provided a process for producing a composite article including the steps of: (i) providing a layer or bundle of reinforced fibers; (ii) providing the curable composition; (iii) contacting the reinforced fibers with the curable composition to coat and/or impregnate the reinforced fibers; and (iv) curing the coated and/or impregnated reinforced fibers at a temperature of at least about 60° C., or at least about 120° C., or even still at least about 195° C.

EXAMPLES

Examples 1 to 14. Bisphenol a Epoxy Resin (ARALDITE® GY 6010 Epoxy resin) was mixed with a curing agent containing a polyetheramine (JEFFAMINE® D-230 amine), glycerin and a tertiary amine (dimethylaminocyclohexane (DMCHA)) to form a curable composition as shown below in Table 1. Each curable composition was cured at 80° C. for three hours and then 125° C. for two hours. The glass transition temperature of the resulting cured articles was then measured by DSC with Example 1 serving as the reference. The results below indicate that a tertiary amine catalyst is needed in order to react glycerin into the polymer backbone. In fact, phase separation was observed when an insufficient amount of DMCHA was used.

TABLE 1

| Example | JEFFAMINE® D-230, g | Glycerin, g | ARALDITE® GY 6010, g | DMCHA, g | $T_g$, °C. |
|---|---|---|---|---|---|
| 1 | 6.00 | 0 | 18.70 | 0.00 | 88.90 |
| 2 | 4.20 | 0.94 | 18.70 | 0.00 | 45.50 |
| 3 | 4.20 | 0.94 | 18.70 | 0.01 | 46.68 |
| 4 | 4.20 | 0.94 | 18.70 | 0.03 | 49.15 |
| 5 | 5.10 | 0.91 | 21.32 | 0.06 | 71.66 |
| 6 | 5.10 | 0.91 | 21.32 | 0.18 | 83.55 |
| 7 | 5.40 | 0.60 | 20.45 | 0.06 | 69.48 |
| 8 | 5.40 | 0.60 | 20.45 | 0.18 | 84.55 |
| 9 | 5.40 | 0.60 | 20.45 | 0.30 | 79.60 |
| 10 | 5.10 | 0.90 | 21.32 | 0.30 | 80.49 |
| 11 | 4.80 | 1.20 | 22.20 | 0.18 | 82.98 |
| 12 | 4.80 | 1.20 | 22.20 | 0.30 | 82.04 |
| 13 | 5.40 | 0.61 | 18.67 | 0.18 | 79.66 |
| 14 | 5.10 | 1.01 | 18.68 | 0.18 | 77.57 |

Examples 15 and 16. Bisphenol A epoxy resin (ARALDITE® GY 6010 epoxy resin) was mixed with a curing agent containing a polyetheramine (JEFFAMINE® D-230 amine), glycerin and a tertiary amine (N-methylmorpholine (NMM)) to form a curable composition as shown below in Table 2. Each curable composition was cured at 80° C. for three hours and then 125° C. for two hours. The glass transition temperature of the resulting cured articles was then measured by DSC.

TABLE 2

| Example | JEFFAMINE® D-230, g | Glycerin, g | ARALDITE® GY 6010, g | NMM, g | $T_g$, °C. |
|---|---|---|---|---|---|
| 15 | 5.40 | 0.61 | 20.45 | 0.18 | 83.45 |
| 16 | 5.11 | 0.91 | 21.32 | 0.18 | 83.08 |

To compare the properties of the final cured articles, curable compositions based on Examples 1 (reference), 6 (15% by weight glycerin), and 8 (10% by weight glycerin) were evaluated. The results are given below in Table 3.

TABLE 3

|  | Ex. 1 | Ex. 6 | Ex. 8 |
| --- | --- | --- | --- |
| Tensile modulus (psi) | 408773 | 438224 | 419330 |
| Tensile strength (psi) | 9353 | 10010 | 10140 |
| % Elongation at Break | 5.04 | 4.78 | 4.97 |
| Flexural modulus (psi) | 424682 | 446175 | 446408 |
| Flexural strength (psi) | 14655 | 15822 | 15423 |

The results above demonstrate that part of the polyetheramine in the curing agent may be substituted with glycerin in an epoxy-containing curable composition without sacrificing the physical properties of the subsequently cured article.

Although making and using various embodiments of the present invention have been described in detail above, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

What is claimed is:

1. A curing agent comprising: (i) from about 65% by weight to about 95% by weight of a polyetheramine selected from the group consisting of: a polyether monoamine, a polyether diamine, a polyether triamine, a multifunctional polyetheramine and a mixture thereof; (ii) from about 0.1 to about 10% by weight of a tertiary amine having the formula $NR_7R_8R_9$ where (a) $R_7$, $R_8$ and $R_9$ are independently $C_1$-$C_{10}$ alkyl groups or (b) $R_7$ and $R_8$ are joined as a heterocycloalkyl residue and $R_9$ is a $C_1$-$C_{10}$ alkyl group, wherein the tertiary amine is substantially free of an aromatic tertiary amine; and (iii) from about 10 to about 30% by weight of glycerin, where the % by weight is based on the total weight of the curing agent.

2. The curing agent of claim 1, wherein the polyetheramine is a polyether diamine.

3. The curing agent of claim 2, wherein the polyether diamine has the formula (3), (4) or (5):

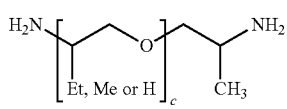

(3)

where c is an integer from about 2 to about 100,
H is hydrogen, Me is methyl and Et is ethyl;

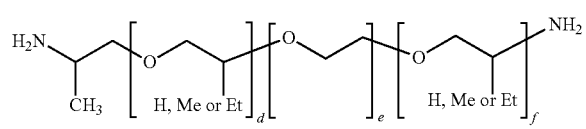

(4)

where H is hydrogen, Me is methyl, Et is ethyl,
e is an integer from about 2 to about 40, and
d and f independently are integers from about 1 to about 10; or

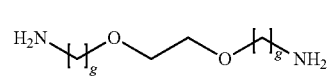

(5)

where g is an integer form about 2 to about 3.

4. The curing agent of claim 1, wherein the polyetheramine is a polyether monoamine having the formula (1) or (1a):

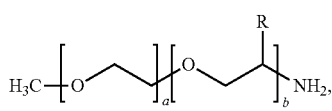

(1)

where R is hydrogen, methyl or ethyl, and
a and b independently are integers from about 1 to about 150; or

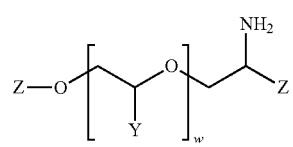

(1a)

where Y is hydrogen, methyl or ethyl,
Z is a $C_1$-$C_{40}$ alkyl group or a $C_1$-$C_{40}$ alkyl phenol group, and
w is an integer from about 1 to about 100.

5. The curing agent of claim 1, wherein the polyetheramine is a polyether monoamine having the formula (2) or (2a):

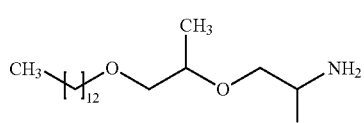

(2)

or

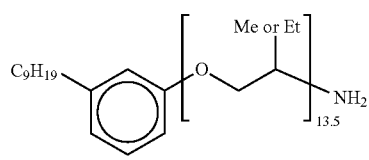

(2a)

where Me is methyl and Et is ethyl.

6. The curing agent of claim 1, wherein the polyetheramine is a polyether triamine.

7. The curing agent of claim 1, wherein the polyetheramine is a multifunctional polyetheramine having the formula (7):

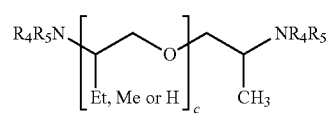

(7)

where each $R_4$ and $R_5$ are independently hydrogen or a hydroxyl group, with the proviso that at least one of $R_4$ is a hydrogen and at least one of $R_5$ is a hydroxyl group, Me is methyl and Et is ethyl.

8. A curable composition comprising: (a) an epoxy resin; and (b) the curing agent of claim 1.

9. The curable composition of claim 8, wherein the epoxy resin is selected from the group of: a polyglycidyl epoxy compound; a non-glycidyl epoxy compound; an epoxy cresol novolac compound; an epoxy phenol novolac compound; and a mixture thereof.

10. The curable composition of claim 9, wherein the epoxy resin is a polyglycidyl epoxy compound.

11. The curable composition of claim 9, wherein the epoxy resin is a non-glycidyl epoxy compound.

12. The curable composition of claim 8, wherein the curing agent is present in amount of at least about 20% by weight, based on the total weight of the curable composition.

13. The curable composition of claim 8, wherein the curable composition is a 2-package type composition.

14. A cured article obtained by applying the curable composition of claim 8 to a substrate and curing the curable composition to form the cured article.

15. A curable composition comprising (a) an epoxy resin and (b) a curing agent comprising: (i) from about 65% by weight to about 95% by weight of a polyetheramine selected from the group consisting of: a polyether monoamine, a polyether diamine, a polyether triamine, a multifunctional polyetheramine and a mixture thereof; (ii) form about 0.1 to about 10% by weight of a tertiary amine having the formula $NR_7R_8R_9$ where (a) $R_7$, $R_8$ and $R_9$ are independently $C_1$-$C_{10}$ alkyl groups or (b) $R_7$ and $R_8$ are joined as a heterocycloalkyl residue and $R_9$ is a $C_1$-$C_{10}$ alkyl group, wherein the tertiary amine is substantially free of an aromatic tertiary amine; and (iii) from about 10 to about 30% by weight of glycerin, where the % by weight is based on the total weight of the curing agent and wherein the curable composition has a ratio of the number of equivalents of reactive amine hydrogens to the number of equivalents of epoxides of about 0.4 to about 0.95.

16. The curable composition of claim 15, wherein the ratio of the number of equivalents of reactive amine hydrogens to the number of equivalents of epoxides of about 0.5 to about 0.85.

17. The curable composition of claim 16, wherein the ratio of the number of equivalents of reactive amine hydrogens to the number of equivalents of epoxides of about 0.6 to about 0.8.

* * * * *